May 31, 1932.　　　　H. SYNCK　　　　1,860,634

CORN PICKING MACHINE

Filed July 15, 1931

INVENTOR
Henry Synck
BY
ATTORNEYS

Patented May 31, 1932

1,860,634

UNITED STATES PATENT OFFICE

HENRY SYNCK, OF COLDWATER, OHIO, ASSIGNOR TO THE NEW IDEA SPREADER COMPANY, OF COLDWATER, OHIO, A CORPORATION OF OHIO

CORN PICKING MACHINE

Application filed July 15, 1931. Serial No. 550,917.

This invention relates to improvements in corn picking machines, it more particularly relating to means for returning to the snapping rolls broken stalks which have escaped the rolls upon the initial encounter therewith and have been partially carried therebeyond.

In the operation of a corn picking machine, at certain seasons and in certain crop conditions, a number of broken stalks are encountered and guided into the machine and weakened stalks are sometimes broken by the lateral swing of the machine or the inability of the operator to guide the machine in a straight course. While some of these broken stalks are engaged by the snapping rolls, many of them are carried therebeyond or onto the conveyor for the snapped ears. Some of the shorter stalks are carried to the discharge end of the conveyor, but the longer stalks, due partly to the difference in weights of the ends of the stalks and to the overbalancing weight of the ear thereon and for other reasons are not wholly engaged by the conveyor and are thrown to one side of the machine to an extent that the stalks clog the operating mechanism, causing an enforced stoppage of the machine.

It is the object of my invention to dispose of these stalks in a manner which will cause the stalks to be properly reengaged by the rolls and drawn therebetween to snap the ears therefrom.

Figure 1:
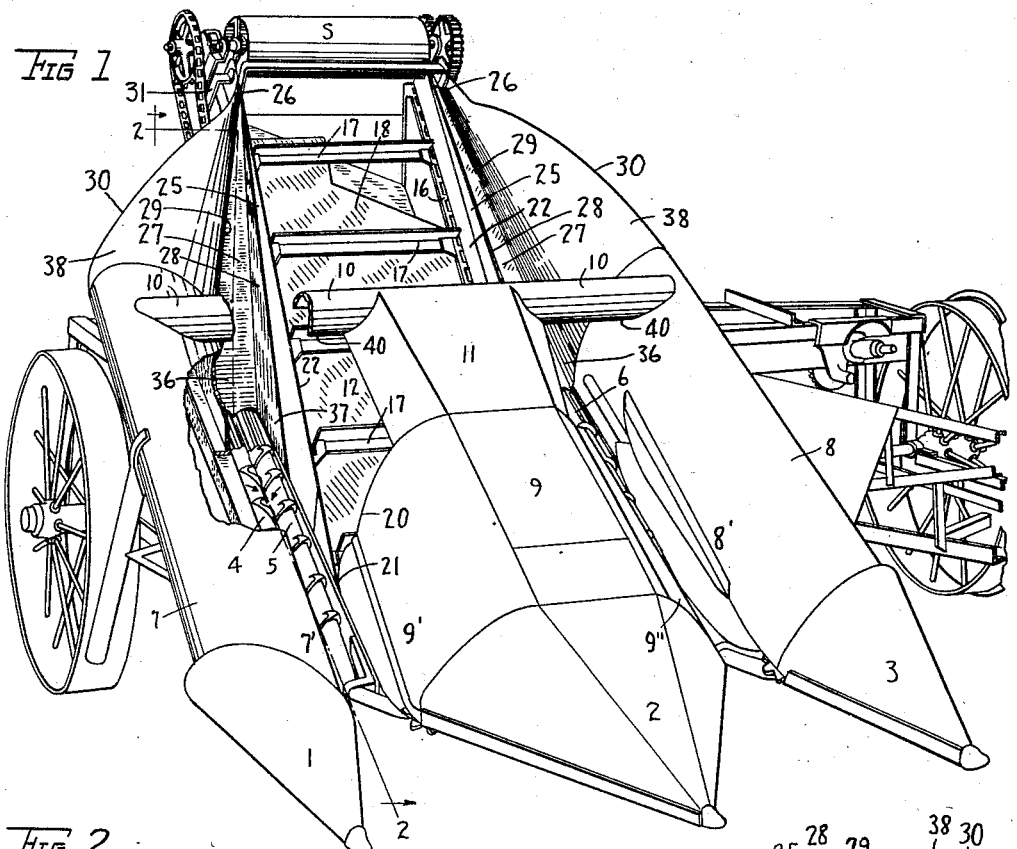
Fig. 1 is a view in perspective of a portion of a corn picking machine showing in general the manner in which my improved features are incorporated therein.
Figure 2:
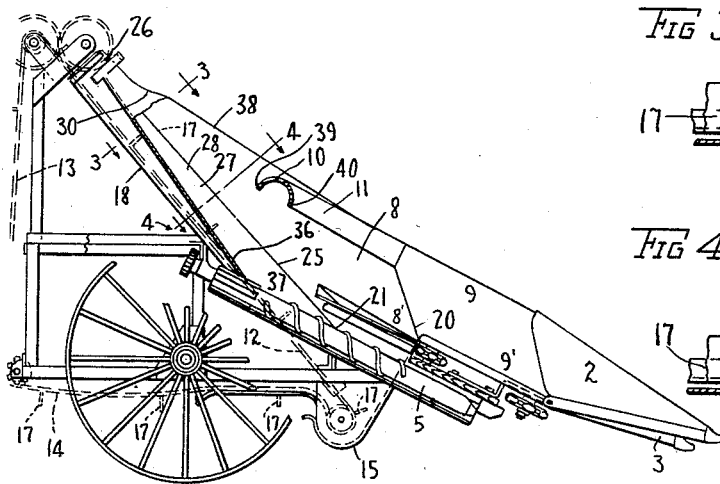
Fig. 2 is a fragmentary longitudinal section on a reduced scale on the line 2—2 of Fig. 1.

Referring to the drawings, and especially to Fig. 1, in which the essential elements of the improvement are seen in general in connection with a corn picking machine of a well-known type, 1, 2 and 3 are respectively right, central and left floating shoes which aid in arranging the standing or down corn as the machine advances for the action thereon by the snapping rolls. In the machine illustrated, two pairs of snapping rolls are employed, portions of one pair being indicated at 4 and 5 at the left hand end of the view, while a part of one roll of the second pair is seen at 6. An elevation of a typical roll is shown in Fig. 2. The pairs of rolls are spaced apart in parallel relation a distance equal to the average space between the rows of corn. The usual gathering chains which are associated with the snapping rolls have not been shown in the present case.

The floating shoes are hingeably attached to the framing of the machine by means not shown, and are usually constructed of formed sheet metal reenforced by bars, the contour of the shoes being such that the stalks will be guided into a sufficiently convenient position for the comparatively efficient handling thereof by the snapping rolls or will be turned aside for the succeeding advance along the adjacent rows. The same contour of the rear portion of each of the shoes is retained in certain other guards which are associated with the shoes, there being a curved sheet metal guard 7 at the left of Fig. 1, and a similar reversed-hand guard 8 at the right, while a central sheet metal guard 9 occupies a portion of the space between and above the lower, forward portions of the snapping rolls. The guards 7 and 8 extend upwardly on about the same inclination as the snapping rolls to a point approximately above the upper ends of the snapping rolls. These guards are secured to the framing by means not shown and extend down to the snapping rolls and are braced one to another by a horizontal semi-cylindrical bar 10 formed of sheet metal. The central guard 9 extends upwardly on the same inclination and terminates at a point approximately above the central portions of the rolls, the downwardly sloping sides extending to parts of the framing near the snapping rolls, while a higher central sheet metal guiding portion 11 of shallow section extends further upwardly and is connected to the horizontal bar 10, formed of sheet metal preferably semi-circular in cross section.

Figure 3:
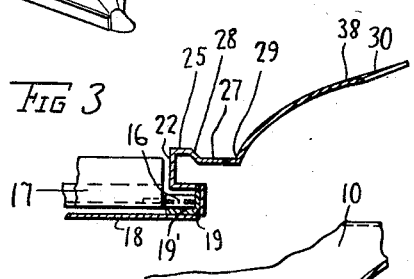
Fig. 3 is a fragmentary transverse section on an increased scale of a portion of one side of a machine, the section being taken on the line 3—3 of Fig. 2.
Figure 4:
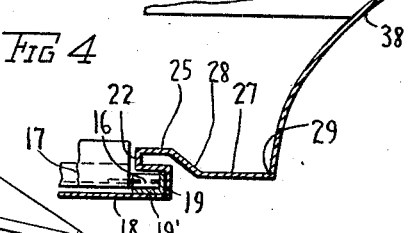
Fig. 4 is a fragmentary transverse section on an increased scale of a portion of one side of a machine, the section being taken on the line 4—4 of Fig. 2.

The central endless conveyor operates in the space between the pairs of snapping rolls, the upwardly inclined run by which ear corn is conveyed to a point where the ears are allowed to fall into a husking roll chute (not shown) being indicated at 12, Fig. 2. The downward run is shown at 13, and the horizontal run at 14, returning to the boot 15 into which the ears fall as they are snapped from the stalks. The conveyor consists of a pair of chains operating over parallel spaced apart sprockets, one chain only being indicated, as at 16, Figs. 1, 3 and 4, and cross bars 17 extending from chain to chain at suitably spaced intervals. A floor for the conveyor is afforded by securing sheets of metal, such as are indicated at 18 secured to the under sides of angle members 19 turned so as to provide a horizontal leg 19' on which the upward run of the elevator chains slide. One member 19 is shown in Figs. 3 and 4.

As the picking machine advances along the rows of corn in the field, the inclined snapping rolls, which revolve rapidly in the direction of the arrows on the rolls in Fig. 1, engage the stalks near the ground line and tend to crowd the stalks downwardly towards the ground. In normal working conditions the stalks are not pulled from the ground, as the speed of rotation of the rolls with reference to the forward speed of the machine as a unit is such that a standing stalk remains substantially vertical during the drawing-down operation. The ear, being larger than the space between the pairs of mating rolls is snapped from the stalk, falling to the right or left, as the case may be into the central elevator boot 15.

A major portion of broken stalks before referred to are not of any considerable length and shortly find their way onto the conveyor by which they are carried upwardly and disposed of by severing mechanism described in the patent of Adolph J. Synck, No. 1,833,138, dated November 24th, 1931, the mechanism being indicated in a general way at S in the present case. Longer broken stalks, however, partly due to the difference in weight of the ends of the stalks and to the overbalancing weight of the ears are not wholly engaged by the central elevator. Usually one end of such a stalk is engaged and carried upwardly for a distance and there released or the stalks are pushed upward by more incoming corn. Due to the inclined positions of all parts associated with the gathering, snapping and elevating mechanisms in this portion of the machine, some of the released stalks gravitate to a point wherefrom they are engaged by the snapping rolls, or are again caught by the central elevator. In many cases however the longer stalks clog the boot of the elevator or are thrown across the sides of the guards 7 and 8 in such great numbers that entanglement of the stalks with the operating mechanism ensued, causing an enforced stoppage of the machine.

To avert the loss in time and labor caused by these stoppages and to insure the beforementioned longer broken stalks being effectively returned to the snapping rolls, I have devised the following constructions:

The sides of the guards 7, 8 and 9 adjacent the pairs of snapping rolls, indicated in general by the characters 7' and 9', 9'' and 8', Fig. 1, slope downwardly to the vicinity of the upper surfaces of the rolls and thereby form a comparatively deep valley, at the bottom of which are the snapping rolls. The sides 9' and 9'' end at the point 20 for the purpose of allowing the snapped ears to drop into the conveyor boot 15. Beginning at the point 21 somewhat above the point 20 on each side of the conveyor is a formed guard of sheet metal having a vertical side 22 attached to the vertical leg of the angle 19, this guard extending upwardly to a point near the upper end of the center elevator. These guards form the inner enclosing sides of a channel in which the conveyor operates. The metal of each guard 22 is bent at right angles to form an upwardly inclined, flat upper surface as indicated at 25, this surface being of a varying width dwindling to nothing at the upper end 26. A channel 27 also of varying width is formed in the sheet extending from the downturned side 28 to the corner 29. From the corner 29 the sheet curves upwardly and outwardly, terminating in the edge 30. The sheet forming this guard, which may be of one piece extending from the vertical side sheet 22 to the edge 30 is further secured to the framing by a bent brace member 31 near the upper end, the brace 31 being secured to an outer side of the angle member 19.

The channel 27 gradually increases in depth as compared to the surface 25, the increase extending from the point 26 to a point 36, the width also varying; said channel extending downwardly to the upper surfaces of the rolls. A pocket at the upper ends of the rolls is thus formed, the point 36 forming the end, the surface 7' (or the one 8') forming one side thereof, and the surface 37 the other side thereof.

The purpose of the outwardly curved guards 38, the changing contour of which may be noted in Figs. 3 and 4, is to prevent the falling over therefrom of any stalks, while the sloping sides cause any stalks to slide downwardly. Eventually one end or the entire stalk will gravitate into the channel 27, and be prevented from continuing in a lateral direction into the path of the central elevator by contact with the surface 28 which forms a side of the channel 27. By the increasing depth of the channel 27 from the point 26, the descending movement of a stalk is accelerated, and pitches sharply downwardly into the pocket described at the upper ends of the rolls, allowing an easy and sure engagement of that stalk by the rolls.

At the same time the upper ends of the rolls are kept comparatively free to receive the broken stalks gravitating from the channel 27 as just described. This is accomplished by the bar 10, as unbroken stalks of any considerable height or inclination are prevented from being acted upon by the upper portions of the rolls by contact of the stalks with the forward surface 40 of the bar 10. It will be seen in Fig. 2 that a vertical line dropped from the surfaces 40 of the bar 10 insure that an ample portion of the upper ends of the snapping rolls is reserved for the reception and engagement of broken stalks.

In this way broken off stalks will either be pushed directly from the snapping rolls into this trough or hopper or are dropped into it laterally by being released from the central elevator. In either case the stalks will gravitate back to the snapping rolls to be eventually seized and removed by them and the ears snapped from them.

Having thus described my invention, I claim:

1. In a corn picking machine, a pair of snapping rolls and an inclined chute above said rolls to receive several stalks and feed same by gravity back to said snapping rolls.

2. In a corn picking machine, a pair of snapping rolls, an inclined conveyor for snapped ears leading therefrom, and means at the side of said conveyor for receiving severed stalks carried beyond the snapping rolls and returning such stalks to the snapping rolls.

3. In a corn picking machine, a pair of snapping rolls, an inclined conveyor for snapped ears leading therefrom, and an inclined chute at the side of said conveyor to receive severed stalks carried beyond the snapping rolls and return such stalks to said rolls.

4. In a corn picking machine, a pair of snapping rolls, an inclined conveyor at the side of said rolls upon which snapped ears are deposited, and an inclined chute at the side of said conveyor and in line with said rolls to receive severed stalks carried beyond said rolls and return such stalks to the rolls.

5. In a corn picking machine, a pair of inclined snapping rolls, an inclined conveyor leading upwardly therefrom, an inclined shelf at the side of said conveyor, an inclined depressed chute at the side of said shelf opposite said conveyor leading to said rolls, said chute gradually widening from top to bottom, and a widely flaring curved guard member on the opposite side of said chute from said shelf.

6. In a corn picking machine, two pair of snapping rolls, an inclined conveyor between said rolls and leading upwardly and rearwardly therefrom to convey snapped ears, and an inclined chute at each side of said conveyor to receive severed stalks carried beyond the snapping rolls and return said stalks to said rolls.

7. In a corn picking machine, two pairs of snapping rolls, an inclined conveyor between said rolls to receive snapped ears therefrom and convey the same upwardly and rearwardly, an inclined chute at each side of said conveyor leading to said rolls, a shelf arranged between each chute and the conveyor, and a wide upwardly and outwardly curved guard on the outer side of each chute.

8. In a corn picking machine, a pair of snapping rolls, a conveyor to convey snapped ears therefrom and to the rear thereof, a chute at the side of said conveyor leading to the rear ends of said rolls to return severed stalks carried upwardly by said conveyor thereto, and a member above the rear ends of the rolls to prevent the stalks from falling forward.

9. In a corn picking machine, a pair of snapping rolls, a conveyor to convey snapped ears therefrom and to the rear thereof, a chute at the side of said conveyor leading to the rear ends of said rolls to return severed stalks carried upwardly by said conveyor thereto, and a member above the rear ends of the rolls to prevent the stalks from falling forward, said abutment also acting to prevent unbroken stalks engaged by the rolls from entering the space between the rear ends of the rolls.

In testimony whereof, I have hereunto set my hand this 16th day of June, 1931.

HENRY SYNCK.

CERTIFICATE OF CORRECTION.

Patent No. 1,860,634.  May 31, 1932.

HENRY SYNCK.

It is hereby certified that error appears in the printed specification of the above numbered patent requiring correction as follows: Page 3, line 35, claim 1, for "several" read severed; and that the said Letters Patent should be read with this correction therein that the same may conform to the record of the case in the Patent Office.

Signed and sealed this 4th day of October, A. D. 1932.

(Seal)

M. J. Moore,
Acting Commissioner of Patents.